Patented Feb. 13, 1934

1,946,645

UNITED STATES PATENT OFFICE 1,946,645

METHOD FOR THE PRODUCTION OF LOW VISCOSITY CELLULOSE DERIVATIVES

Cyril J. Staud and Thomas F. Murray, Jr., Rochester, N. Y., assignors to Eastman Kodak Company, Rochester, N. Y., a corporation of New York No Drawing. Application June 24, 1929
Serial No. 373,469

11 Claims. (Cl. 260—102)

This invention relates to a method for reducing the viscosity of cellulose esters and other cellulose derivatives and particularly to the use of chlorine gas in reducing the viscosity of cellulose acetate.

The production of cellulose esters is well known to those skilled in this art and no more than a reference thereto need be made for the understanding of this invention. For instance, the production of cellulose acetate divides itself normally into three steps comprising, (1) the pretreatment of the cellulose with acetic acid with or without a catalyst; (2) the acetylation of the pretreated cellulose with acetic anhydride; and (3) the hydrolysis of the acetylated cellulose by destroying the anhydride with a small amount of water. The control of the viscosity which the finished cellulose acetate will have upon solution thereof in a suitable solvent is important. The control of such viscosity during the production of the cellulose acetate has been found to have a number of difficulties and to require a rather perfect technique of operation in producing a cellulose acetate of the desired viscosity without affecting the character of the cellulose acetate in a deleterious manner.

We have discovered that cellulose acetate can be so affected by the treatment thereof with chlorine gas, either alone or in conjunction with other fluids, that the viscosity which the acetate would normally have in a given solvent is quite materially reduced by such treatment. Cellulose acetate which has been air dried to a relatively low moisture content may be treated in accordance with our invention by merely passing chlorine therethrough for a period of time until the acetate has the desired viscosity. Where it is desirable to shorten or lessen the chlorine treatment such treatment may be followed by a treatment with sulfur dioxide or ammoniacal methanol or other suitable fluids.

We have found that by passing a slow current of chlorine gas through air dried cellulose acetate for approximately one to one and one-half hours that the cellulose acetate will be quite effectively bleached but that the acetate so treated will have a viscosity in solution not substantially less than that which it had before the chlorine treatment. If it is desired to merely bleach the acetate the chlorine gas treatment should be followed by treatment with a slow current of air for approximately one-quarter of an hour in order to remove the excess chlorine. The acetate will then be ready for solution with any suitable solvent for whatever purpose may be desired. We should regard a slow current of chlorine gas as possibly in the neighborhood of 100 to 200 cc. per minute for sixty gram batch of cellulose acetate.

In seeking further use for our discovery that chlorine gas has a noticeable effect on cellulose acetate we have made the striking discovery that if air dried cellulose acetate is further subjected to chlorine gas treatment for a considerably longer period of time (than that required for bleaching) that the viscosity which that acetate will have upon solution is considerably less than that of the untreated acetate. For instance, we treated a sample of cellulose acetate which had been air dried to contain approximately 5 per cent of moisture content. This acetate was acetone soluble and when dissolved in four parts of acetone had a viscosity of approximately 25 seconds when determined by the dropping ball method. Through sixty grams of this acetate inclosed in a container we passed substantially dry chlorine gas at a rate of about 460 ccs. per minute for varying lengths of time. We have found that upon a treatment of approximately 10 minutes with this quantity of chlorine gas that the acetate is bleached to a very acceptable white but that no material change in the viscosity of the acetate has occurred.

It is very probable that the bleaching which occurs because of the chlorine treatment either when fairly large quantities of chlorine gas are supplied or when the chlorine is only supplied slowly can be attributed to a surface reaction whereby the chlorine combines with the slight amount of moisture present in the acetate to form hydrochlorous acid which is sufficiently oxidizing in character to cause the acetate to be bleached.

We found, however, that upon continuing the chlorine treatment of the actate as described in the previous paragraph that after the chlorine had been passed through the acetate for a period of approximately one-half hour that the chlorine had the quite surprising action of reducing the viscosity of the cellulose acetate to about eight and one-half seconds when determined by the dropping ball method. We also found that if it is desired to reduce the viscosity of the acetate further that a treatment for one hour under the above conditions will accomplish a reduction of the viscosity to approximately six seconds or if continued for two hours the viscosity will be reduced to approximately five seconds and if continued for a period of four hours the viscosity will be reduced to approximately two and one-half seconds.

A similar viscosity reduction has been found to occur when fluids having an action on the cellulose derivative similar to that of chlorine are employed. For instance in our copending application Serial No. 373,470 aqueous solutions of various oxidizing agents are disclosed which have this unexpected viscosity reducing effect following any bleaching action which may occur. Other fluids than those specifically pointed out may be employed within the teachings of this application.

At times it may be desired to further shorten the time of chlorine treatment or to reduce the amount of chlorine gas used for reasons of economy or otherwise. Under such circumstances we have found that approximately the same results as above indicated can be accomplished by treating the air dried cellulose acetate for approximately one and one-half hours with a slow current of chlorine gas, the excessive chlorine being then removed by slowly passing air through the acetate for approximately fifteen minutes. Following this removal of chlorine the acetate may then be treated for one hour by passing therethrough a slow current of sulfur dioxide gas. The acetate may then be treated for approximately one-quarter of an hour with a slow current of air to remove the excess gas. The viscosity of the cellulose acetate may thus be reduced to from 20 percent to 10 percent of that which the acetate originally had in solution. Although we do not intend to be limited by any theory regarding the reason for obtaining viscosity reduction by this last described method, it is quite probable that sulfuryl chloride is formed upon the passage of sulfur dioxide gas through the acetate causing an exothermic reaction which raises the temperature of the acetate locally thereby hastening the change in the cellulose molecule which contributes to the lowering of the viscosity of the acetate.

We have also found that the extent of the chlorine gas treatment may be somewhat lessened by the use of ammoniacal methanol. For instance, we treated ten grams of acetone soluble cellulose acetate in a suitable container by passing a slow current of chlorine gas therethrough for a period of approximately three hours. We then permitted the cellulose acetate containing the residual chlorine to stand for a period of approximately fifty-two hours. A slow current of air was then passed through the acetate for approximately one-quarter of an hour to remove the residual chlorine.

The resulting cellulose acetate was then treated with a mixture composed of approximately 200 ccs. of methanol and about 5 ccs. of 28 percent ammonium hydroxide for approximately one-quarter of an hour. The extraction liquid was then removed by filtration, the acetate residue washed with methyl alcohol and the acetate dried in air. Upon the subsequent solution of the cellulose acetate in a suitable solvent it was found that the viscosity of the solution was very much lower than that which the same acetate had when dissolved in the same solvent at the same concentration before receiving the foregoing treatment. In the case of this treatment, as in the case of the sulfur dioxide treatment, a local exothermic reaction also appears to take place due to the formation of ammonium chloride which hastens the viscosity reduction treatment.

Thus it will be observed that by the treatment of cellulose acetate with a quantity of chlorine gas insufficient in quantity or concentration for viscosity reduction that a thorough bleaching of the acetate will take place but that if the chlorine gas treatment be continued for approximately three or more times or at approximately three or more times the rate employed for the bleaching treatment that a very surprising reduction in the viscosity of the acetate will occur; also the acetate may be given somewhat more chlorine treatment than is required for the bleaching step but insufficient for the desired viscosity reduction and thereafter be given a treatment with sulfur dioxide or ammoniacal methanol to accomplish the desired viscosity reduction.

Cellulose nitrate, cellulose ethers and mixed cellulose esters may also be treated in accordance with our invention to produce the effects described by substantially following the procedure noted.

In the foregoing specification and in the claims appended hereto, where reference is made to the vicosity of a cellulose ester such as cellulose acetate or cellulose nitrate, such terminology is used somewhat loosely and it is to be noted that where such terminology is employed it is intended to refer to the viscosity which that cellulose ester would have when dissolved in a given quantity of a suitable solvent. Also, ozone is used to indicate an ozone bearing gas. Also, where the term "air dried" is used it is intended to mean a product which has approximately the moisture content which such product would have if subjected to the drying action of air under ordinary atmospheric conditions, and where the term "air-dried cellulose acetate" is used it is intended to refer to acetate which is in the precipitated or gelatinated air-dried form, such as acetate which has been precipitated and dried following hydrolysis or acetate which is in the form of films, such as film scrap.

What we claim as our invention and desire to be secured by Letters Patent of the United States is:

1. The process which comprises subjecting an air dried cellulose acetate to the action of a gas which will combine with the residual moisture in the cellulose acetate to form an oxidizing compound.

2. The process which comprises subjecting air dried cellulose acetate to the action of chlorine gas until the cellulose acetate is bleached.

3. The process which comprises subjecting an air dried cellulose ester to the action of chlorine gas for a longer period of time than that required to fully bleach the cellulose ester.

4. The process which comprises subjecting an air dried cellulose acetate to the action of chlorine gas for a longer period of time than that required to fully bleach the cellulose acetate.

5. The process which comprises subjecting an air dried cellulose ester to the action of chlorine gas at a greater concentration than that required to fully bleach the cellulose ester.

6. The process which comprises subjecting an air dried cellulose acetate to the action of chlorine gas at a greater concentration than that required to fully bleach the cellulose acetate.

7. The process which comprises treating an air dried cellulose ester with chlorine gas until the viscosity thereof has been changed.

8. The process which comprises treating an air dried cellulose acetate with chlorine gas until the viscosity thereof has been changed.

9. The process which comprises subjecting air dried cellulose acetate to the action of chlorine gas until the cellulose acetate is bleached, aerating the acetate and then subjecting the acetate to the action of sulfur dioxide.

10. The process which comprises subjecting air dried cellulose acetate to the action of chlorine gas until the cellulose acetate is bleached, aerating the acetate and then subjecting the acetate to the action of sulfur dioxide until the viscosity of the acetate is reduced.

11. The process of reducing the viscosity of air-dried cellulose acetate which comprises treating the air-dried cellulose acetate with an oxidizing agent in a gaseous state to reduce the viscosity.

CYRIL J. STAUD.
THOMAS F. MURRAY, Jr.